Figure 1:
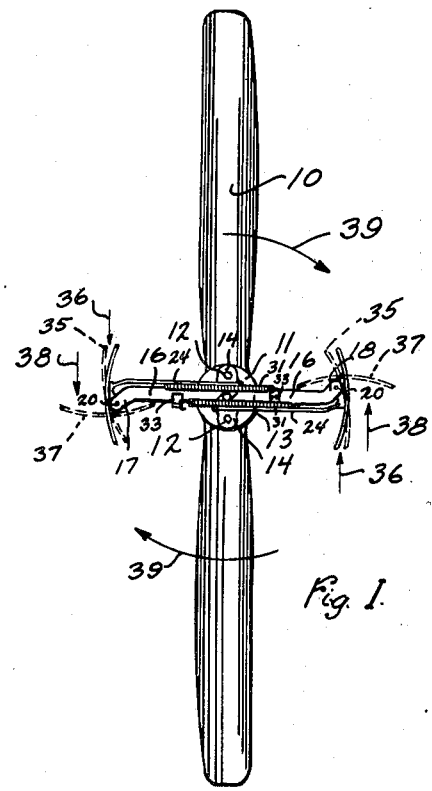

Aug. 30, 1949.  J. R. ALBERS ET AL  2,480,687
GOVERNOR FOR WIND DRIVEN PROPELLERS

Filed Dec. 6, 1944                                    3 Sheets-Sheet 1

Inventors
John R. Albers
Gerhard H. Albers
By Murray Robinson
Attorney

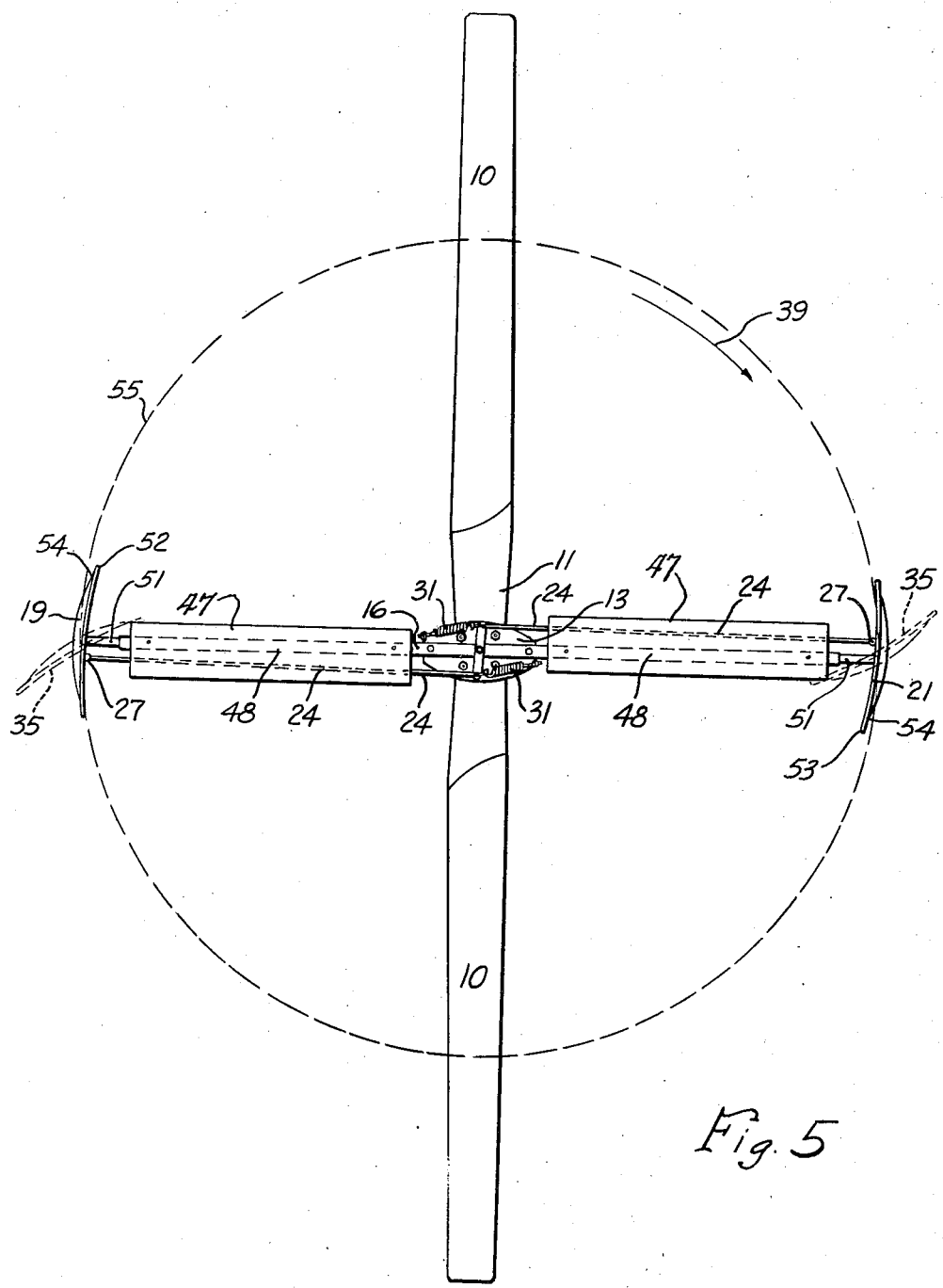

Aug. 30, 1949.  J. R. ALBERS ET AL  2,480,687
GOVERNOR FOR WIND DRIVEN PROPELLERS
Filed Dec. 6, 1944  3 Sheets-Sheet 3
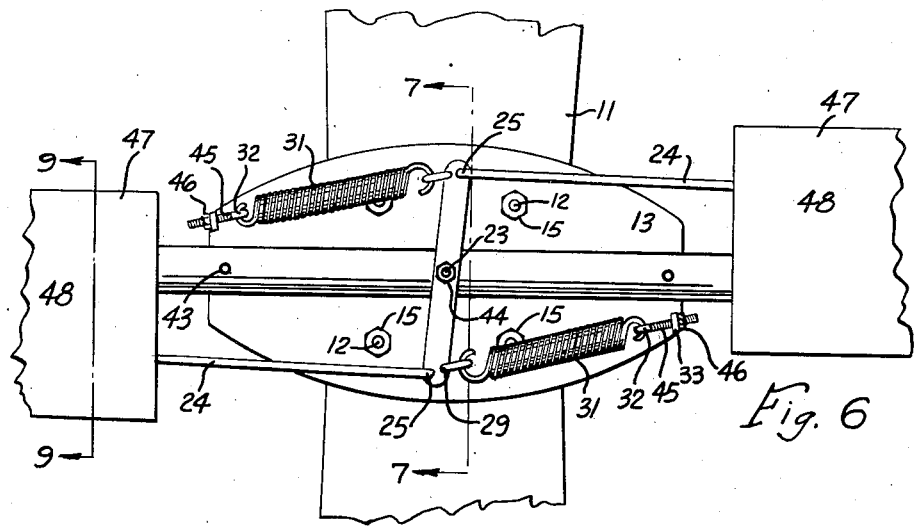
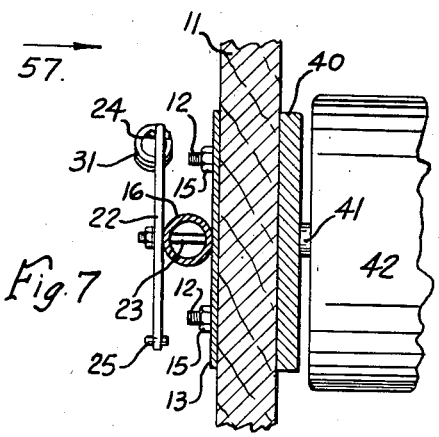
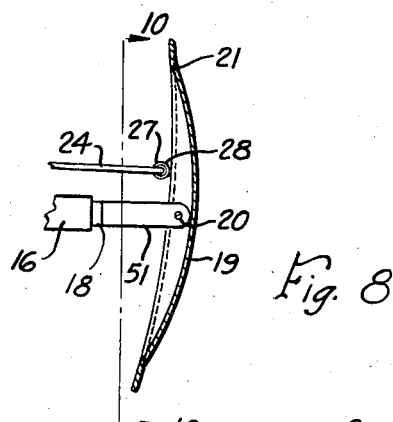
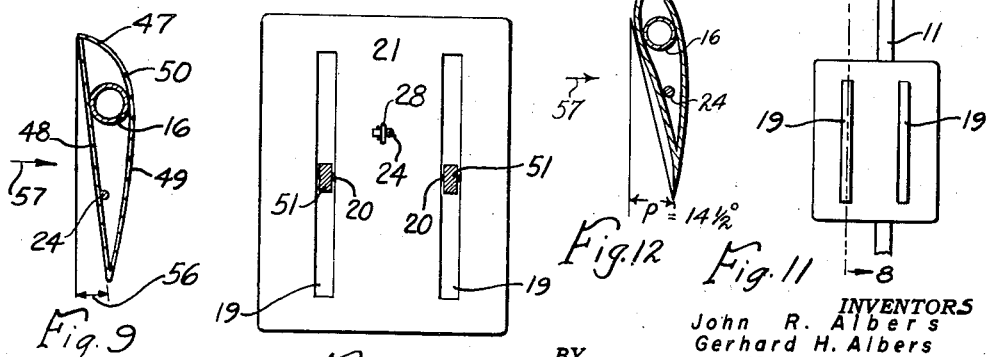
INVENTORS
John R. Albers
Gerhard H. Albers
BY Murray Robinson
ATTORNEY.

Patented Aug. 30, 1949

2,480,687

UNITED STATES PATENT OFFICE 2,480,687

GOVERNOR FOR WIND-DRIVEN PROPELLERS

John R. Albers and Gerhard H. Albers, Sioux City, Iowa, assignors to Wincharger Corporation, a corporation of Minnesota Application December 6, 1944, Serial No. 566,874

2 Claims. (Cl. 170—75)

Our invention relates to a governor for propellers of the type used for converting wind power to mechanical power for generating electricity for charging batteries and other purposes.

An object of our invention is to provide a governor which is readily attachable to a wind driven propeller of any standard type.

A further object of our invention is to provide a governor which will accurately govern the speed of such propellers so that the speed will not become too great in order to prevent undue vibration of the supporting structure carrying the wind driven unit, to prevent overloading of the generator, to prevent overcharging of the batteries and to prevent other undesired effects.

A further object of our invention is to provide a governor having features for utilizing the governing action by natural forces with a minimum number of movable parts.

A further object of our invention is to provide a governing device in which a pair of centrifugally urged flaps are adapted to present their broadened surfaces in the line of travel of the propellers so as to cause a turbulent or spoilage effect wherein centrifugally urged wind or air forces will be located in the path of travel of the propeller blades, thereby causing an abnormal condition wherein the normal wind forces striking against the propellers are disrupted to correspondingly cause a loss of efficiency in the rotating blades to provide a governing effect, and to further provide a resisting braking action.

A further object of our invention is to provide a cross-balancing arrangement for a wind driven propeller in which the cross-balancing arrangement has auxiliary blades attached thereto having a normal starting pitch to assist the starting action of the main propeller blades and to provide an additional surface for assisting the structure in rotation.

A further object of our invention is to provide means for synchronizing the governing action of the centrifugally urged flaps.

A further object of our invention is to provide such a governor which is simple in construction and can be manufactured at a very reasonable cost.

Figure 2:
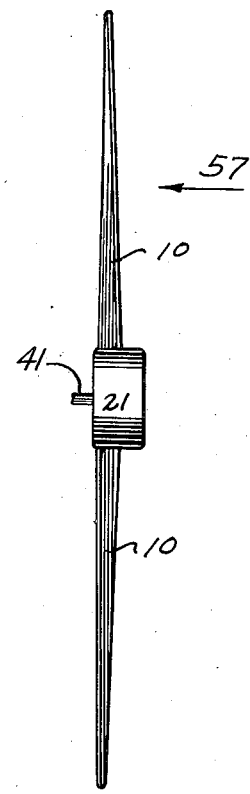
Figure 3:
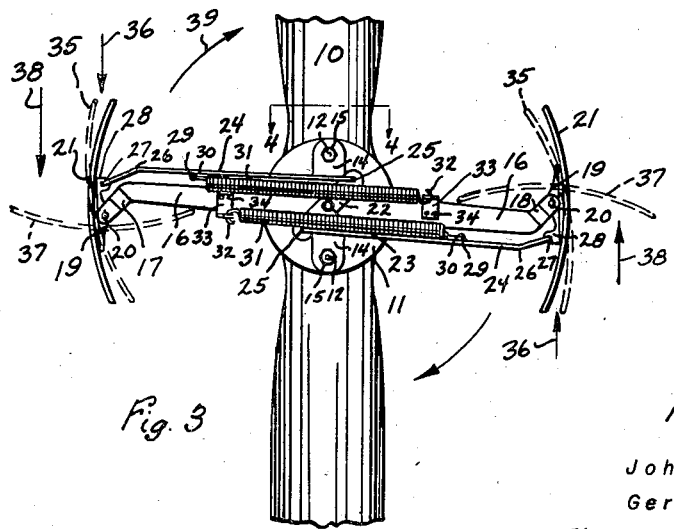
Figure 4:
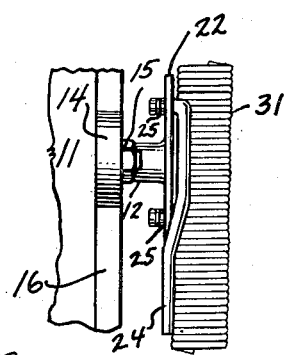

With these and other objects in view, our invention consists in the construction, arrangement and combination of the various parts of our device, whereby the objects contemplated are attained, as hereinafter more fully set forth, pointed out in our claims, and illustrated in the accompanying drawings in which:

Figure 1 is a front elevation of the governor attached to a standard wind driven propeller, Fig. 2 is a side view of Fig. 1, Fig. 3 is an enlarged detail in elevation of the governor, Fig. 4 is an enlarged detail taken generally along the lines 4—4 of Fig. 3, Fig. 5 is a front elevation showing a modified form of the governor and starting blades as attached to a wind driven impeller, Fig. 6 is an enlarged detail of the synchronizing arrangement and central portions of the impeller and governor shown in Fig. 5, Fig. 7 is a sectional view taken substantially along the lines 7—7 of Fig. 6, Fig. 8 is a sectional view taken substantially along the lines 8—8 of Fig. 11 showing one governor flap and certain parts adjacent thereto, Fig. 9 is a sectional view taken along the lines 9—9 of Fig. 6, Fig. 10 is a sectional view taken along the lines 10—10 of Fig. 8, and Fig. 11 is a view of the outer face of the flap shown in Fig. 8.

Fig. 12 is a sectional view of one of the auxiliary propeller blades.

This application is a continuation in part of our prior copending application S. N. 345,167, filed July 12, 1940, now abandoned for Governor for wind driven propellers, and of our prior application S. N. 65,834, filed February 26, 1936, renewed December 22, 1939, now Patent 2,277,011 issued March 17, 1942, which was copending with said application S. N. 345,167.

The principal problem encountered in generator plants for farm uses, etc., is that of accurately governing the speed of the wind propeller which drives the generator. If the speed becomes too great, it will result in overcharging and the like with its attendant injurious results. It is the object of our invention to provide a governor which can be easily attached to such propellers which will accurately govern the maximum speed of the same. To attain this end we use the principles of centrifugal force and wind resistance in a structure which will now be explained.

We have used the numeral 10 to designate the wind driven propeller which can be made of any suitable form usable in the art, and preferably made from wood. The hub of the propeller is indicated by the numeral 11 and includes the two threaded studs 12. We provide the metal casting 13 having the projecting ears 14 which include suitable openings through which the studs 12 pass, and which ears are then locked by means of nuts 15. The casting 13 extends into the two integral arms 16. It will be noted that the arms 16 are generally at right angles to the longitudinal vertical axis of the propeller. The left hand arm 16, as shown in the drawing, includes the downwardly bent fork member 17, and the right hand arm, the upwardly bent fork member 18. These members receive the members 19 which are pivotally pinned at 20. The members 19 are attached firmly to the arcuate plates 21. The plates 21 are of a fairly substantial length and width, the proportionate width being shown more clearly in Fig. 2.

A further member 22 rocks pivotally upon the extending center stud 23, and includes openings at each end, which openings receive the extremities of the rods 24 at 25. The rods 24 are slightly bent at 26 and are pivotally received at 27 in openings in the ears 28, which ears are integral extensions of the members 19. Attached at 29 to both rods are the ends 30 of the tension springs 31. The other ends of the springs 31 are attached at 32 to the upwardly bent members 33 which are suitably attached at 34 to the arms 16.

The arcuate plates 21 are so positioned that normally the curvature thereof is a true circle or in the true circular rotation about the center of the propeller. In other words, during normal rotation and when the plates are not deflected, they will revolve directly in the path of rotation of the propeller without encountering any opposing wind resistance. The tension in the springs will maintain only a certain resistance, and it will be noted that the pivoting points 29 of the arcuate plates 21 are off of the true horizontal center, therefore, after the speed has been built up over a certain point, the centrifugal force and momentum will tend to throw the plates to the position as shown by the dotted lines at 35. As soon as the plates have been thrown out of the true circle of rotation which they are normally in, there will be wind effects opposing the plates as indicated by the arrows 36. As the speed is built up to a substantially greater degree than that necessary, the plates will furthermore take their maximum position as shown in the dotted structure at 37 wherein the opposing forces at 38 will be considerably greater. Since such opposing forces are directly opposite to the direction of rotation of the propeller as indicated by the arrows 39, the result will be to retard the speed of rotation of the propeller, and it will be slowed up thereby, and the size of the plates 21 together with the tension of the springs 31 are so adjusted to maintain the propeller at a certain maximum speed without exceeding this limit. In other words, the tendency of the combined forces is such as to maintain a certain constant maximum speed under any conditions by virtue of the braking action of the plates.

It will be noted that the attachment of the rods 24 to the tension springs 31 and especially to the pivotally mounted member 22 at 25, provides the feature of insuring the same deflection for both plates, so that one plate will not be deflected more than another in the case of a weaker spring, etc.

A further important action which takes place in the use of this governing device is as follows: During rotation of the entire device, and as explained heretofore, the flaps 21 will be centrifugally urged upon corresponding speed to the dotted position shown in Fig. 3, and in this position a further action will take place other than the braking action. When in this position, the effect of the flaps is to cause a substantially large volume of air to be impelled radially and centrifugally therefrom and outwardly in an annular formation, or in a plane in which the impeller blades 19 rotate. Also, these wind forces or disturbances will occupy a cylinder either the width of the flaps or substantially greater. Naturally, the amount of air impelled outwardly will be proportionate to the amount of deflection of the flaps from their normal position to their position of greatest resistance so that, as a result, the faster the structure rotates, the greater is the effect and extent. If the propeller were running in a normal medium, there would be no effect of this spoilage, or the effect caused by the turbulence of the air forces, and the propeller could, in the absence of these flaps, rotate at a considerably higher speed than that desired. However, by virtue of this description, it will be clearly seen that, since the blades will not be rotating in the natural medium caused by the wind forces thereon, they will slow down under such conditions since the normal forces of the wind will be disrupted and disarranged to such an extent that the governing function will take place. In other words, the radial and other wind forces thus set up artificially will produce a resultant force along up the blade which will slow it down to a material degree. When the flaps are in their normal position, or when they are not deflected outwardly, there will be no disrupting or spoilage effect in any way, since the surface presented against the wind forces is at an absolute minimum, and the spoiling effect will, correspondingly, gradually increase radially, proportionately to the deflection of the flaps away from such normal position.

In the modified form of the invention shown in Figs. 5 through 11, the parts which are the same as those shown in Figs. 1 through 4, and parts which though differing in detail from those shown in Figs. 1 through 4 perform like functions bear the same reference characters as in Figs. 1 through 4. Referring now to Fig. 5, we have used the character 10 to designate the windward faces of a pair of impeller blades designed for rotation in the direction of the arrow 39 formed from a unit piece of material having a hub 11 which member 11 is suitably attached to a circular plate 40 (see Fig. 7) which plate, in turn, is attached to the shaft 41 which shaft 41 is attached to the rotor of the electric generator 42. Attached to the plate 40 are a series of equally spaced studs 12, and receiving the studs 12 are corresponding openings in the oval plate 13. The studs 12 pass through the propeller hub 11 and the plate 13 is clamped thereto by means of the nuts 15. Firmly attached to the plate 13 and in transverse relation to the blades 10 is the pipe 16 which is attached at 43 thereto, and attached centrally to the pipe 16 is the stud 23 which stud pivotally receives the link 22 with a suitable nut 44 serving to maintain the link adjacent to the pipe 16. Attached at 29 (see Fig. 6) to the upper and lower ends of the link 22 are the springs 31 which are attached at 32 to the threaded studs 45 which studs 45 pass through the small ears 33 which ears are integral portions of the plate 13. The nuts 46 are threadably engaged with the threaded studs 45.

Affixed to the transverse pipe 16 are a pair of starting blades 47 having their faces 48 facing the windward side of the arrangement and including the rear surfaces 49 having the airfoil 50 thereon, such blades being formed preferably of sheet metal, the pipe 16 being located therein, and passing longitudinally through the same. Also pivotally attached at 25 to the upper and lower ends of the link 22 are the transverse rods 24 which rods are also received within the boundaries of the blades 47 and which are pivotally attached at 27 (see Figs. 1, 4, and 6) to the eyes 28 which eyes 28 are attached centrally to the governing flaps 21. The governing flaps 21 are arcuate in shape with their convex faces facing outwardly and are of substantial dimension in length and width, and include a pair of depressed channel-shaped vertical ribs 19. Attached to the extremities of the pipe 16 are the U-shaped frames 18 having the legs 51 with each of the legs 51 being received within channels 19 and being pivotally pinned at 20 thereto with the pivoting point 20 being outside of the normal contour of the flaps 21, and with the point 20 also being located substantially at the center of the flaps.

The arcuate flaps 21 are so positioned that normally the curvature thereof is but slightly out of line with a true circle about the center of the propeller. In other words, during normal rotation and when the flaps are not deflected, they will revolve almost directly in the path of rotation of the propeller without encountering any great opposing wind resistance. However the tension in the springs will maintain only a certain resistance, and it will be noted that the pivoting points 20 are located outside the main body of the flaps 21, therefore, after the speed has been built up over a certain point the centrifugal force and momentum will tend to throw the plates to the position as shown by the dotted lines in Fig. 5.

In addition to unbalancing the flaps with respect to centrifugal forces, it should be noted that the slight initial eccentricity of the flap curvature with respect to the true circle about the center of the propeller causes certain wind forces to act to turn the flaps to the dotted position shown in Fig. 1. The wind forces acting at 54 on the leading edge 52 of the flaps 21 is greater than that acting on the trailing edge due to the curvature of the flaps so that the net wind force is in aiding relation to the centrifugal forces tending to turn the flap. In addition to the centrifugal forces due to the offset pivoting of the flaps, there is also added the centrifugal forces due to other masses free to move and unbalanced about the pivots 20 such as that due to the rods 24.

As soon as the flaps have been thrown out from their normal position near the true circle of rotation there will be increased wind effects opposing the flaps. As the speed is built up to a substantially greater degree than that necessary to move them initially, the flaps will move gradually toward their maximum position of displacement wherein the opposing forces of the air will be considerably greater. Since such opposing forces are directly opposite to the direction of rotation of the propeller as indicated by the arrow 39, the result will be that upon increasing wind velocity the rate of increase of the speed of rotation of the propeller above the speed at which the flaps start to move is much less than at lower speeds of rotation, and the size of the flaps 21 together with the tension of the springs are so adjusted to maintain the propeller at a certain maximum speed without substantially exceeding this limit. In other words, the tendency of the combined forces is such as to maintain a certain nearly constant maximum speed under any conditions by virtue of the braking action of the flaps.

It will be noted that the attachment of rods 24 to the pivotally mounted link 22 provides the features of insuring the same deflection for both flaps, so that one flap will not be deflected more than another in the case of a weaker spring, etc.

A further important action which takes place in the use of this governing device is as follows: During rotation of the entire device, and as explained heretofore, the flaps 21 will be centrifugally and aerodynamically urged upon corresponding speed to the dotted position in Fig. 5, and in this position a further action will take place other than the braking action. When in this position the effect of the flaps is to cause a substantially large volume of air to be impelled radially and centrifugally therefrom and outwardly in an annular formation into the plane in which the impeller blades 10 rotate. Also, these wind forces or disturbances will occupy a helicoid either the width of the flaps or substantially greater. The amount of air impelled outwardly along the flaps will be proportionate to the amount of deflection of the flaps from their normal position to their position of greatest air resistance so that, as a result, the faster the structure rotates, the greater is the effect and extent. If the impeller blades 10 were running in a normal medium, there would be no effect of spoilage or the effect caused by the turbulence of the air forces, and the propeller could, in the absence of these flaps, rotate at a considerably higher speed than that desired. However it will be clearly seen that, since the blades will not be rotating in the natural medium caused by the wind forces alone, they will slow down under such conditions since the normal forces of the wind will be disrupted and disarranged to such an extent that the governing function will take place. In other words, the radial and other wind forces thus set up artificially will produce such disturbances along the blades that they will be slowed down to a material degree. When the flaps are in their normal position, or when they are not deflected outwardly, there will be substantially no disrupting or spoilage effect, since the surfaces presented against the wind forces are at a minimum, and the spoilage effect will, correspondingly, gradually increase radially proportionately to the deflection of the flaps away from such normal position.

It will be also noted from Fig. 5 that since the convex faces of the arcuate flaps 21 are toward the direction of rotation, the air will be spilled off of these flaps to a greater degree than that caused by a flat flap or a flap with its concave surface in the direction of rotation. This considerably increases the spoilage effect and similarly the governing effect.

The tension of the springs 31 can be adjusted by means of the nuts 46 which are threadably engaged with the studs 45. By adjusting the initial tension of the spring the governing flaps can be biased to remain in inoperative position until the desired speed is reached corresponding to full load of the generator, maximum charging rate of the batteries, or maximum safe load on the supporting tower. This is a very desirable feature to enable the user to adapt the governor to his own particular needs. It should also be noted that the springs are located near the center of the governor. This reduces the centrifugal forces acting on the springs which might otherwise cause them to break.

The additional blades 47 assist in the starting action of the entire arrangement, and after such starting provide the further advantage of carrying the governing structure so that the weight and slight resistance caused by the governing structure at initial or medium speeds is thereby compensated since these blades present sufficient surface to provide this feature, with such blades being pitched at a suitable angle for this purpose as indicated by the character 56 in Fig. 9, the wind direction being indicated by the character 57.

It is preferred that an extremely thick airfoil section be used as blades 47 enclosing supporting pipes 16 and rods 24, and this thick section should be pitched at a large angle to the plane of rotation of blades 47. By an extremely thick airfoil section is meant one which has not only a thickened leading edge but also is very thick in its central parts. By a large pitch is meant one in the order of 8° to 15°. Preferred sections for this purpose are as described in N. A. C. A. Bulletins as Rhode St. Genese 1, Eiffel 386 or Gottinger 222. The great advantage of such an extremely thick section pitched at a large angle to its plane of rotation is that it provides very large starting torque from rest by reason of the high pitch, thereby allowing smaller, harder starting high speed geared generators to be driven. The pitch of the section should be approximately such that its no lift direction lies in its plane of rotation to cause its no load tip speed ratio to be large.

For similar reasons, it is preferred to use such extremely thick sections for the main blades 10 also. Such thick sections have the further advantage that their transverse rigidity is much greater than a thin blade having a high tip speed ratio. Such high transverse rigidity not only makes the whole assembly rugged but in the governor airfoils provides great supporting strength around the pipes 16 supporting the flaps 21.

These extremely thick airfoil sections which are of such described advantage have maximum thicknesses which are usually at least 15%, and sometimes as much as 25% or more, of the chord length of the airfoil.

Having described the construction and operation of two embodiments of our invention, we now wish to compare them to point out certain common features. In the first described embodiment of our invention the direct braking forces caused by air resistance to the motion of the plates 21 will be somewhat greater than the corresponding braking forces in the second embodiment because of the different curvature of the plates with respect to the direction of rotation. On the other hand the spoilage effect limiting the speed of rotation of the structure due to disturbance by the plates 21 of the wind stream in which the propeller blades move is greater in the second embodiment because of the different curvature of the plates with respect to the direction of rotation. In this latter connection it will be seen that the plates 21 in the first embodiment deflect the air inwardly and it is only by virtue of the simultaneous rotation imparted to the air that it ultimately moves outwardly due to centrifugal action. In the second embodiment the plates deflect the air outwardly as they rotate, thereby aiding the centrifugal action and causing a larger volume of turbulent air to be thrown into the wind stream in which the propeller blades move. In both embodiments however, both direct braking and spoilage effects occur.

In connection with the spoilage effect of the plates 21 there is another feature which must be pointed out. The volume of air swept through by the propeller blades is of a helical shape. This is obvious because the propeller blades are rotating in a plane while at least a component of the air is moving normal to the plane of rotation. For this reason, in order to spoil a maximum of the air through which the blades move, the plates 21 not only should be mounted in the plane of rotation and angularly advanced with respect to the blades 10 but should also be displaced somewhat to the windward side of the plane of rotation of the blades. As is apparent from Figs. 2 and 11, the center lines of the plates 21 are displaced toward the windward side of the propeller blades 10.

Instead of using plates perpendicular to the plane of rotation of the propeller as herein described, in which case the plates should be displaced somewhat toward the windward side of the propeller blades, it is also possible to use plates which are perpendicular to the axis of rotation in normal position and which turn to positions at an angle to the plane of rotation when governing so as to deflect air into the wind away from the plane of rotation as well as throw it radially outward. This arrangement is described in the application of John R. Albers, S. N. 249,995, filed January 9, 1939, now Patent 2,215,456, issued September 24, 1940. With this arrangement the air through which the propeller blades sweep may be spoiled even if the braking plates are located somewhat behind the plane of rotation of the propeller blades.

Still another feature pertaining to the spoilage of the governor is the location of the braking plates with respect to the active surfaces of the propeller blades. It is desirable that the plates be mounted near enough to the axis of rotation so as to spoil the air over substantially the entire active surface of the propeller blades when the plates are moved out of their normal position so that a maximum governing efficiency will be obtained. The active surface of the blades is the portion where the surface is suitably disposed to abstract energy from the wind. Generally the portion of the blades next to the hub are not so shaped for the reason that the peripheral velocity is so low and the moment arm so short that very little additional power is gained from such portion. For this reason it is sufficient if the flaps are near enough to the axis of rotation to spoil the air over roughly the outer two thirds of the propeller blades. Since there is some spoiling of the air within the circle of rotation of the brake flaps due to air being drawn in near the center of the blades by the suction created by the brake flaps, it has been found satisfactory to mount the flaps so that the circle of rotation of the inner edges of the flaps when in their maximum governing position is less than one half of the way out from the axis of rotation to the tips of the blades. It may be noted that although the center third of the blades does not rotate with as high a tangential velocity as the outer third and although its moment arm is shorter, the direction of the relative wind is such as to produce a greater angle of attack with consequent increased force so that the center third of the blades is nevertheless a very active part.

It is to be noted that the spoilage effect referred to includes not only the production of turbulence or eddy currents in the wind stream but also the change in the direction of the relative wind. The brake flaps when in governing position increase the radial component of the wind velocity along the blades. Therefore, the resultant wind, of the radial wind component and relative wind component, to the blades becomes more nearly parallel to the longitudinal axis of the propeller blades. Hence, the cross section of the blades parallel to the wind direction changes and it is believed this change alone may in some cases be enough to keep the blade speed down to the desired value.

In both embodiments of the invention it is important that the springs biasing the flaps to their inactive position be so chosen that the rate of increase of spring tension on displacement of the flaps is greater than the rate of increase of centrifugal and aerodynamic forces acting to cause further motion of the flaps. Otherwise, once the flaps start to move they will move immediately all the way to their position of maximum displacement. Although such an effect has been considered by some to be desirable, we have found that it causes sharp and violent variations in the propeller speed tending to produce "hunting" or a continuous self sustained operation of the governor flaps. The sudden changes in speed and the hunting action of the governor tend to cause both it and the propeller to break down or wear out more quickly and there may also be undesirable effects on the rest of the system connected to the propeller. In this connection it may be again pointed out that the biasing springs are preferably located near the axis of rotation. When the flaps are displaced, the springs also are extended and if long springs are used or if they are mounted away from the axis of rotation and on the same side of the axis of rotation as the flaps which they bias, the increased centrifugal force on the rotating springs alone may be greater than the increased spring tension due to the displacement with the consequence that the flaps will continue to move to their positions of maximum displacement.

It has been stated that the governing flaps should be angularly advanced in the plane of rotation with respect to the propeller blades. We have found that in a two bladed propeller the most suitable position is 90° away from the blades. This is due in part to the fact that in such position the arms supporting the flaps serve also to balance the governor with respect to gyroscopic forces. The only shape which is perfectly balanced for this purpose is a circular disc but the addition of the two cross arms to a two bladed propeller greatly reduces the unbalance. When a propeller is rotating at a fair speed and is suddenly turned about its vertical axis due to a shift in the wind, the forces set up in the supporting structure are very great. In addition, there are strong vibrations set up because the magnitude of the force varies as the propeller rotates. By the use of the cross-balancing arrangement provided by the supporting arms and flaps, these undesirable effects are to a great extent eliminated.

It will now be seen that we have provided a governor for wind driven propellers which efficiently utilizes natural forces in suitably governing the speed of such propellers, that the governor is readily attachable, and can be manufactured at a very reasonable cost.

Some changes may be made in the construction and arrangement of the parts of our invention without departing from the real spirit and purpose of our invention, and it is our intensions to cover by our claims any modified forms of structure or use of mechanical equivalents, which may be reasonably included within their scope.

We claim:

1. A wind driven prime mover comprising a propeller having a plurality of blades disposed symmetrically about the axis of rotation of the propeller and a governor having a plurality of plates of arcuate section mounted for pivotal motion about axes parallel to said axis of rotation of the propeller and supported on slender arms attached to said propeller and symmetrically disposed about said axis of rotation of the propeller, said plates and arms being equal in number to the number of propeller blades and being disposed in positions midway between each pair of adjacent propeller blades, each of said supporting arms being housed in an auxiliary starting propeller blade of high pitch and thick section, means for holding said plates in non-governing position at speeds of rotation of said propeller below a predetermined speed, each of said plates in nongoverning position being disposed with the radii of its arcuate section passing at least close to the axis of rotation of the propeller, and means for gradually moving said plates into positions of increased governing effect as the speed of rotation of said propeller rises above said predetermined speed, said plates in governing positions lying with their convex surfaces facing in the direction of rotation of said supporting arms and lying in the path of travel of the air subsequently traversed by the propeller blades.

2. A wind driven prime mover comprising a propeller having a plurality of blades disposed symmetrically about the axis of rotation of the propeller and a governor having a plurality of plates of arcuate section mounted for pivotal motion about axes parallel to said axis of rotation of the propeller and supported on arms attached to said propeller and symmetrically disposed about said axis of rotation of the propeller, said plates and arms being equal in number to the number of propeller blades and being disposed in position one between each pair of adjacent propeller blades, means for holding said plates in non-governing position at speeds of rotation of said propeller below a predetermined speed, each of said plates in its non-governing position being disposed with the radii of its arcuate section passing by the axis of rotation of the propeller a predetermined distance therefrom such that the leading edge of the plate is nearer the axis of rotation of the propeller than the trailing edge of the plate, and means for gradually moving said plates into positions of increased governing effect as the speed of rotation of said propeller rises above said predetermined speed, said plates in their governing positions lying with their convex surfaces facing in the direction of rotation of said propeller blades and lying in the air path subsequently traversed thereby.

JOHN R. ALBERS.
GERHARD H. ALBERS.

REFERENCES CITED

The following references are of record in the file of this patent:

UNITED STATES PATENTS

| Number | Name | Date |
| --- | --- | --- |
| 603,806 | Zwiebel | May 10, 1898 |
| 932,521 | Wallace | Aug. 31, 1909 |
| 1,537,401 | Blumschein | May 12, 1925 |
| 1,636,434 | Pinaud | July 19, 1927 |
| 2,037,528 | Miller | Apr. 14, 1936 |
| 2,058,500 | Plucker | Oct. 27, 1936 |
| 2,074,149 | Jacobs | Mar. 16, 1937 |
| 2,126,202 | McCally | Aug. 9, 1938 |
| 2,148,921 | Allen | Feb. 28 1939 |
| 2,215,456 | Albers | Sept. 24, 1940 |
| 2,277,011 | Albers et al. | Mar. 17, 1942 |

FOREIGN PATENTS

| Number | Country | Date |
| --- | --- | --- |
| 27,187 | Australia | 1930 |
| 99,190 | Sweden | Apr. 18, 1940 |
| 178,314 | Switzerland | Sept. 16, 1935 |
| 639,882 | France | Mar. 17, 1928 |
| 661,014 | Germany | June 9, 1938 |